(12) United States Patent
Prentice et al.

(10) Patent No.: US 7,623,722 B2
(45) Date of Patent: Nov. 24, 2009

(54) ANIMATED DISPLAY FOR IMAGE MANIPULATION AND CORRECTION OF DIGITAL IMAGE

(75) Inventors: Wayne E. Prentice, Honeoye Falls, NY (US); Steven M. Bryant, Holly, NY (US); Jorge L. Rivera, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 832 days.

(21) Appl. No.: 10/693,040

(22) Filed: Oct. 24, 2003

(65) Prior Publication Data
US 2005/0108645 A1    May 19, 2005

(51) Int. Cl.
| | |
|---|---|
| G06K 9/40 | (2006.01) |
| G06K 9/00 | (2006.01) |
| H04N 5/00 | (2006.01) |
| G06F 15/00 | (2006.01) |
| G06K 1/00 | (2006.01) |
| G06K 15/12 | (2006.01) |
| H04N 1/00 | (2006.01) |
| H04N 1/40 | (2006.01) |
| H04N 1/38 | (2006.01) |
| G09G 5/02 | (2006.01) |
| G06F 3/00 | (2006.01) |

(52) U.S. Cl. .................. 382/254; 348/606; 358/1.9; 358/447; 358/461; 358/463; 382/100; 345/594; 715/762

(58) Field of Classification Search .................. 382/100; 345/594; 715/762; 358/1.9, 447, 461, 463; 348/606
See application file for complete search history.

(56) References Cited

U.S. PATENT DOCUMENTS 6,295,136 B1 * 9/2001 Ono et al. .................. 358/1.15

OTHER PUBLICATIONS

Adobe photoshop 6.0, "easy Adobe Photoshop 6", Sep. 2000, p. 158-159.*
Microsoft Gif Animator, 1995, Screen shot.*
Using Adobe Photoshop 5, Jul. 1998, QUE, p. 536-538.*
Colorfulness, Wikipedia.org.*
Microsoft Gif Animator, 1995, Screen Shot.*
Rey Chrissy, Flash MX, 2002, e-book, Creating a Shape Tween.*
"Harry's Filter" Version 3.0 for Windows, http://thepluginsite.com/products/harrysfilters/index.htm, Jan. 2004.*

* cited by examiner

*Primary Examiner*—Brian P Werner
*Assistant Examiner*—Randolph Chu
(74) *Attorney, Agent, or Firm*—Stephen H. Shaw; Justin D. Petruzzelli

(57) ABSTRACT

A method for selectively optimizing a plurality of image characteristics for captured images, that includes modifying two or more one-dimensional image characteristic controls using a single loop position controller having one-dimensional control. The single loop position controller traverses useful ranges of each of the two or more one-dimensional image characteristic controls. Additionally, a user cycles through several combinations of the two or more one-dimensional image characteristic controls within a video loop; and has a means of selecting a desired image rendered according to the two or more one-dimensional image characteristic controls.

12 Claims, 9 Drawing Sheets

ANIMATED DISPLAY FOR IMAGE MANIPULATION AND CORRECTION OF DIGITAL IMAGE

FIELD OF THE INVENTION

The invention relates generally to the field of image processing, and in particular to a user interface for image processing. More specifically, the invention relates to a user-friendly image characteristic control for rendering digital images.

BACKGROUND OF THE INVENTION

In a typical consumer image processing application a user can modify an image to achieve a more pleasing look. Two common user interfaces are sliders and ring-around controls. In the former, a number of sliders are presented to the user. These sliders, examples of which are depicted in FIG. 1, can modify a number of image characteristics, such as: brightness, contrast, saturation, hue, etc. In this user interface, a 1-d control is mapped to a 1-d slider 111. Specifically, in FIG. 1, a slider 100 works by having the user click and drag a "thumb" 110 of a slider control 111 until a desired value, represented by the slider, is set. FIG. 1 presents the user with two distinct slider controls: brightness 111 and contrast 112. In a typical imaging application, there are some interactions between slider controls 111 and 112. A user must alternatively adjust both slider controls 111 and 112 to achieve her desired rendering. The number of slider controls, the type of operations the slider controls perform, and the interactions between these slider controls can be daunting to a user.

A second method used to reduce the complexity is to provide a "ring around" control where a number of images surround a reference image 310, thus creating a 3×3 grid 320. This type of control, 2-d ring around control user interface 300, is depicted in FIG. 3. The reference image 310 at the center of grid 320 represents initially the original image and subsequently the current preferred image 310 as described below. In this display, images along a vertical and a horizontal axis differ by a single 1-d control; the corner images show the interaction of the two 1-d controls. This user interface is limited to two 1-d controls. The row above represents a perturbation of an image characteristic in one direction; the row below represents a perturbation of the same characteristic in the opposite direction. A second image characteristic can be represented in the same way using the vertical direction within a column. The user interacts with the control by clicking on a preferred image in the grid 320. Clicking causes the preferred image to become the center image. A new set of surround images are then computed with the center image becoming the new baseline. In FIG. 3 this method is limited to two controls (brightness 340 and contrast 350). The size of increment between images is selected by using the thumbnail variation slider 330.

Other layouts and arrangements allow more than two controls, but the interactions between the controls cannot be presented and represent the perturbation of only a single imaging control. This type of control, 1-d ring around control user interface 200, is shown in FIG. 2. Instead of a slider, the user is presented with a number of images. Any images along any given line (horizontal, vertical, or diagonal) differ by a single 1-d image control. Interactions between controls are not displayed. The center image is the "current pick" 201. The center image initially matches the original image 205. Images 203 and 208 vary in the amount of green and magenta, respectively, creating a green-magenta axis. A cyan-red axis (206, 204) and a blue-yellow axis (207, 202) as well as a brightness axis (209, 211) are also displayed. However the interaction between adding blue and brightness for example are not displayed.

A third approach has been created by PhotoGenetics and is shown in FIG. 4 as user interface 400. This method presents the user with a paired choice of two images: a current image 410 and a modified image 440. The user indicates which image is preferred and by how much, using a slider 420. Using the information provided by the slider 420, the program computes a new transform to apply to create a new modified image to be evaluated. The process is repeated until the Stop Evaluation Button 430 is selected. This information is used along with prior choices to compute a new image with a different rendering. As parameters are determined for image rendering, the current image 410 is updated and the process continues. Each time the current image 410 is updated it is considered a new generation. A record of each generation is kept and can be selected using a set of buttons 450. The original image 460 is also displayed. This method requires either a large number of choices (interactions) or large steps between adjustments.

FIG. 5 depicts a screen shot of the Color Mechanic Interface. This program allows the user to identify colors in the input image 550 that require improvement. The user selects color control points 510 that she finds objectionable in the input color hexagon 520. This creates a control point 510 on both the input color hexagon 520 and the preview color hexagon 530. The user can then move the color control point 510 on the preview color hexagon 530 to remap the color to a preferred color which can be viewed in the preview image 540.

PROBLEM TO BE SOLVED BY THE INVENTION

In the prior art described above, imaging controls force users to "find" the preferred image rendering. That is to say, the user interfaces require a user to perform a number of operations to seek-out the best set of adjustments to achieve the optimal imaging rendering either by manipulating a set of sliders or incrementally selecting preferential images from a ring-around. In many cases, the optimal value for each parameter must be found individually. In order to find the optimal rendering, it is incumbent upon the user to understand how changing a control value such as hue, contrast, or brightness will affect the image. Accordingly, image processing experts may not fully understand the interactions between brightness, contrast, and gamma correction, much less everyday consumers attempting image processing.

SUMMARY OF THE INVENTION

The present invention is directed to overcoming one or more of the problems set forth above. Briefly summarized, the present invention provides a method for selectively optimizing a plurality of image characteristics for captured images, including modifying two or more one-dimensional image characteristic controls using a single loop position controller having one-dimensional control, wherein the single loop position controller traverses useful ranges of each of the two or more one-dimensional image characteristic controls. Additionally, providing a video loop of captured images to a user by cycling through several combinations of the two or more one-dimensional image characteristic controls; and a means of selecting a desired image rendered according to the two or more one-dimensional image characteristic controls.

A second aspect of the present invention provides an image editor, that includes: a single one-dimensional image characteristic control that traverses useful ranges of each of a plurality of one-dimensional image characteristic controls; and a video loop that cycles through several combinations of the single one-dimensional image characteristic control for controlling a plurality of image characteristics.

ADVANTAGEOUS EFFECT OF THE INVENTION

The present invention has the following advantages:

1. The user does not have to actively "find" the best rendering; it is presented to the user within a stream of images.

2. The user does not require knowledge of the controls or how they impact the image, or even the number of controls being modified.

3. This invention allows a user to find the optimal rendering without an understanding of the interactions between controls.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein.

To facilitate understanding, identical reference numerals have been used, where possible, to designate identical elements that are common to the figures.

DETAILED DESCRIPTION OF THE INVENTION

According to one aspect of the present invention, a single user interface control can optimize a plurality of image characteristics by mapping a set of range limited image controls onto a single control called the loop position control. This control then pertubates through several combinations of the single image characteristic controls, presenting the series of pertubated images as a "video loop" to the user. The user watches the video loop and stops it when the most pleasing image is presented. The user also has the ability to "scroll" through the video loop to exactly find the most pleasing image.

Figure 7:
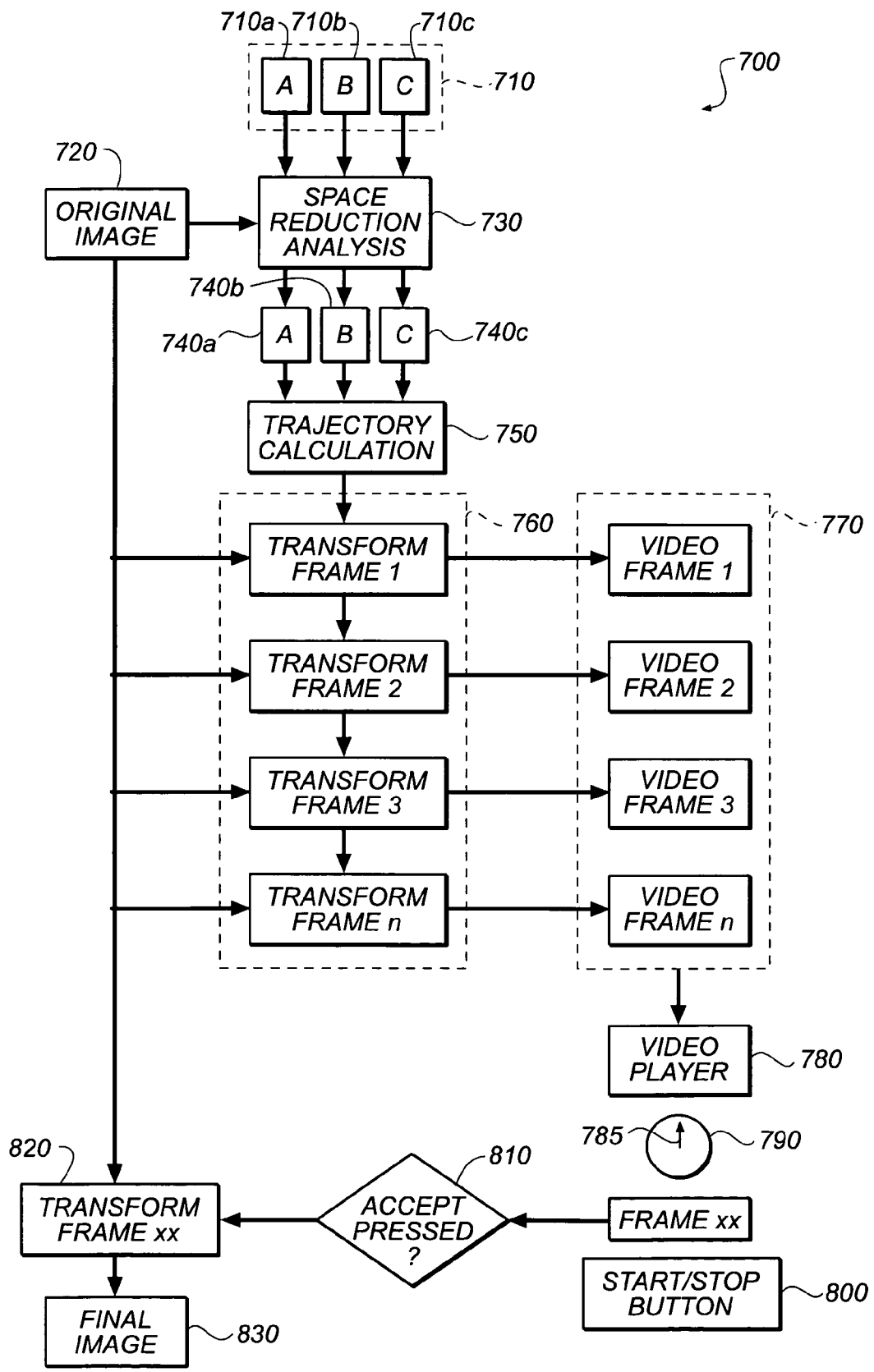
FIG. 7 is a block diagram of a system for practicing the present invention.

A block diagram 700 depicting an operating system for the present invention is shown in FIG. 7. The major components of this invention include an original image 720, a set of image characteristic controls 710a, 710b, 710c, a space reduction analysis 730, and a trajectory calculation 750. One embodiment of the present invention has different image controls for creating a set of image transforms 760. The image transforms 760 are applied to the original image 720 to create a video stream 770, where each frame in the video stream 770 is computed using various combinations of the different image controls. The images comprising the video stream 770 may be computed either prior to the display of the first frame, or in real time as each frame is displayed. A video player 780 displays the sequence of processed images. loop position control 790 allows the user to select the best rendering among the video stream 770, and displayed by video player 780, using either a stop/start button 800 or by setting the position of the loop position control 790 using the position indicator 785. Once the best rendering is accepted via pressing an accept button 810, that same rendering is applied to the original image by transform frame 820, creating a final image 830 with optimal rendering as selected and determined by the user.

More specific details of the present invention will now be described. The present invention includes a set of two or more image characteristic controls 710. These image characteristic controls could be, for example, contrast 710a, brightness 710b, and gamma correction 710c. The range of each of the image characteristic controls 710 is limited to a set of values that would produce a visually pleasing output to a particular user. The space reduction analysis 730 is a process that uses image content to determine a useful range of each of the controls. For example, a brightness control 710b can be limited to a range that excludes settings where the image is completely black or white. This example describes a coarse setting of ranges. Depending upon the application, the range of controls can alternatively be very fine. An example of this is where an "AutoFix" button, not shown herein, is used to set the values for the controls. The result of an auto fixing operation is a conventional single value for each image characteristic control. The present invention can use a single value found by autofixing as a starting point and then iteratively adjusts in small degrees about the computed autofix value for a range of values. Consequently, the result of the space reduction analysis is a set of range-limited image characteristic controls 740a, 740b and 740c.

Each image characteristic control 710 represents a single degree of freedom. Consider, for example, the present invention being used to find the optimal value of three different image characteristic controls: contrast 710a, brightness 710b, and gamma correction 710c. In order to display to a user combinations of all three controls, a three-dimensional volume of range-limited characteristic image controls must be traversed. Additionally, the flow of images in the video stream 770 must be smooth without perceptual discontinuities when looped and controlled by the loop position control 790. The trajectory computation 750 computes a path through the range-limited n-dimensional space to create a set of images that smoothly transitions from one image to the next in video stream 770. The result of the trajectory calculation is a list of image parameters that are applied to the original image 720.

Figure 8:
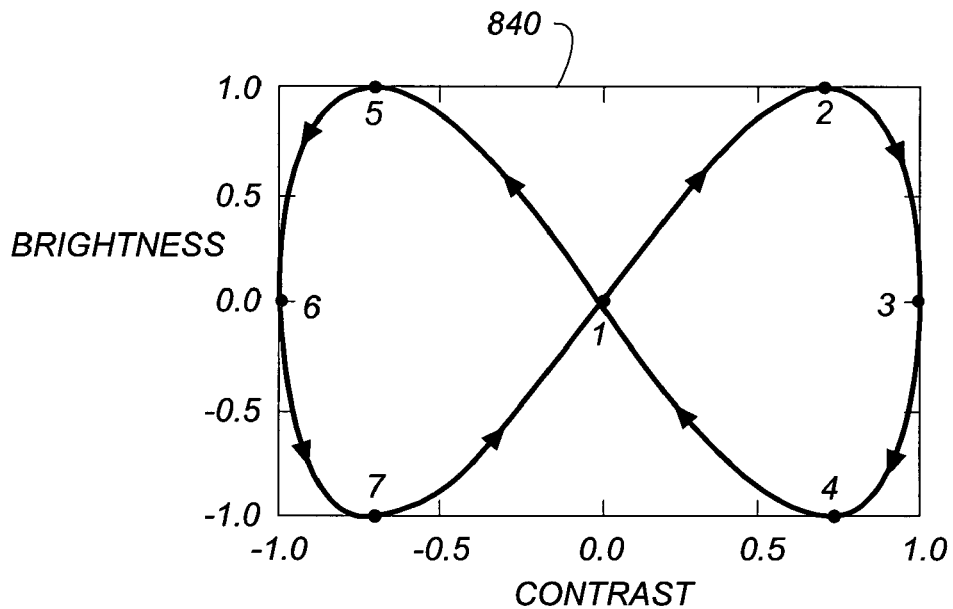
FIG. 8 is a plot of the path of the 1-d single control mapped in a 2-d space (n=4)

FIG. 8 depicts a brightness vs. contrast plot 840. In this figure, a trajectory in the 2-d space is described showing an example consisting of two controls: contrast and brightness.

Figure 11:
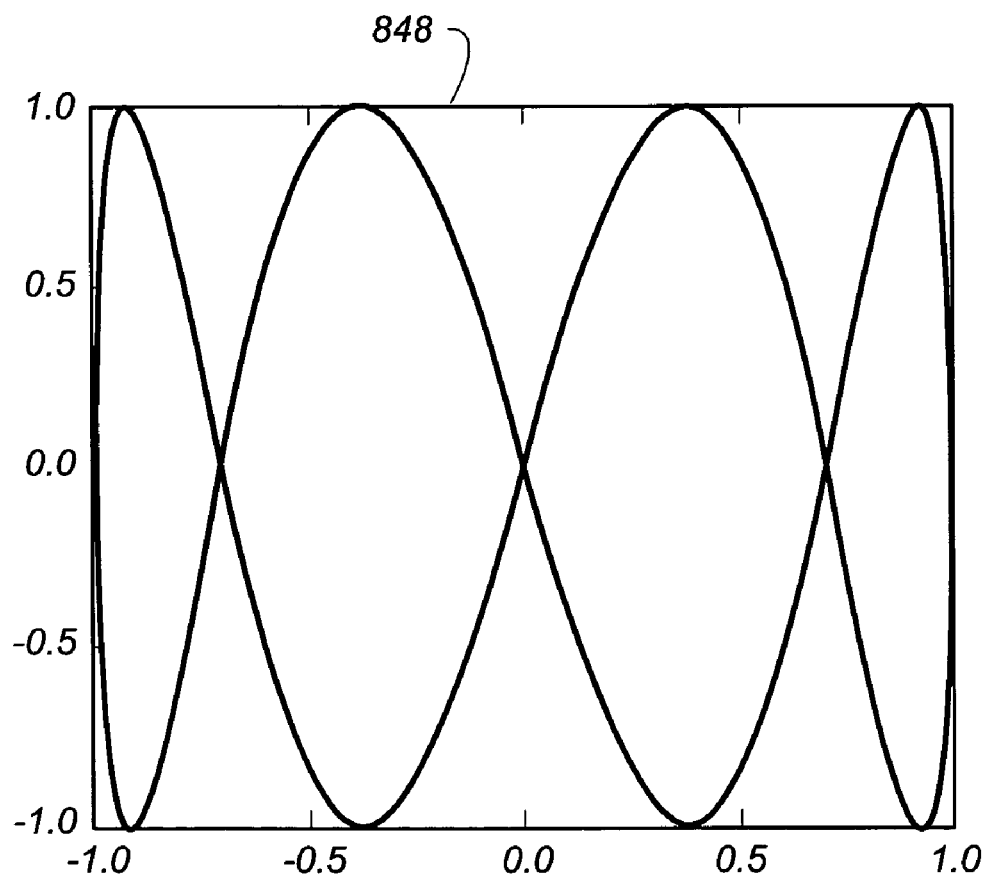
FIG. 11 is a plot of the path of the 1-d single control mapped in a 2-d space (n=8).

Assume that the brightness and contrast controls have been mapped to a range −1 to 1 by the space reduction analysis. The trajectory in FIG. 8 describes the values to be used for each frame in the video loop. Starting at Contrast=0 and Brightness=0 (at the position labeled with a 1), the first frame in the video loop displays the image in it's unmodified state. The next sets of frames are computed with both brightness and contrast increasing until the brightness control achieves its maximum value (position 2) after which contrast is held somewhat constant as brightness is decreased (position 3). Contrast is then decreased as brightness is increased as the image half way through the loop is back to its nominal state (position 1). The loop completes with contrast less than zero as brightness is again brought to a maximum (position 5), then a minimum while bringing contrast to a minimum (position 7). The loop completes one cycle with the image and is again returned to it's nominal state. In this example, not every combination of brightness and contrast are rendered. Since these controls are continuous, an infinite number of frames would be required, and it is not possible to render all possible combinations. If a finer sampling is required in a particular dimension, the n parameter can be increased as shown in FIG. 11, where plot 848 depicts a 1-d Single Control Path in a 2-d Space (m=1, n=8). The trajectory calculation has the properties of providing a set of image characteristic control settings that are continuous from one frame to the next. It generalizes well to multiple dimensions and is scalable to provide additional sampling of the n-dimensional space described in the set of range limited characteristic controls.

Figure 9:
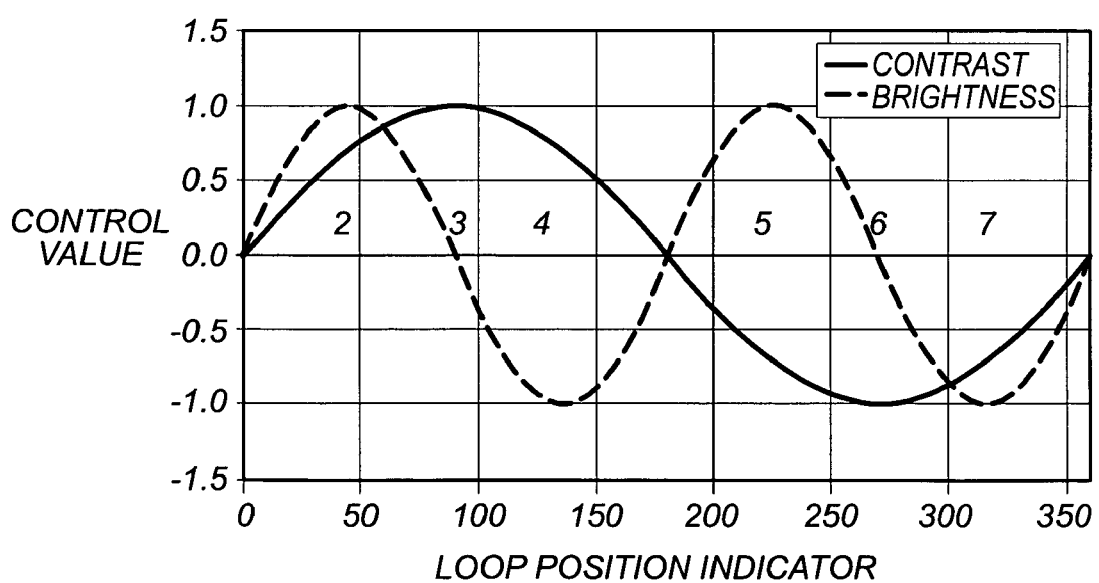
FIG. 9 is a plot of a brightness/contrast control values vs. Loop Position Indicator Position.
Figure 10:
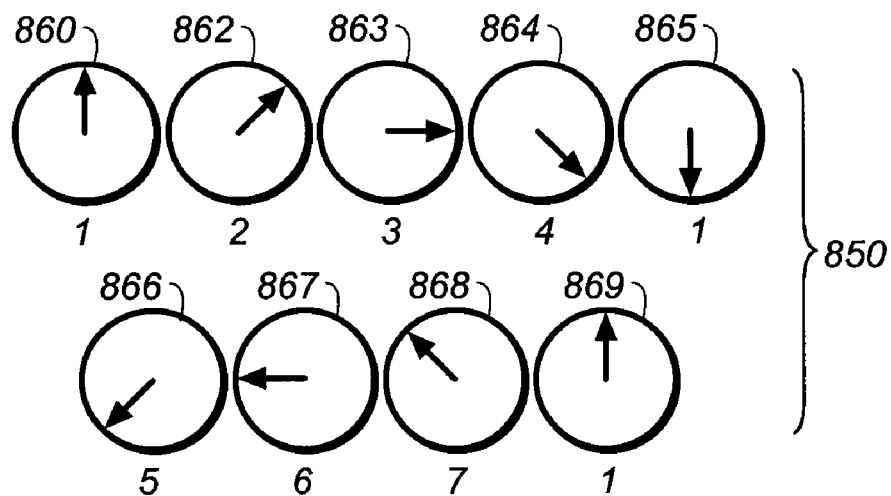
FIG. 10 is a set of loop position indicators demonstrating the position of the indicator for the various values of the brightness/contrast values.

For additional clarity, a plot of brightness/contrast vs. loop position indicator is depicted in FIG. 9. FIG. 10 depicts a set 850 of corresponding positions for the loop position control 790 for various values of the brightness/contrast controls. The first loop position indicator in FIG. 10 represents the initial condition 860. In this position, all controls are in their neutral (no effect) position. This can be seen as well in FIGS. 8 and 9 at the position labeled 1. At this point both controls have a value of zero. As the indicator on the loop position indicator progresses clockwise, such as shown with indicator 862, the values assumed by the brightness and contrast controls progress towards the point labeled 2 in FIGS. 8 and 9. In a similar fashion, the loop position indicators 863, 864, 865, 866, 867, 868, and 869 show the progression of the control back to the initial position. The values assumed by the controls are shown in both FIGS. 8 and 9 with the corresponding labels. The trajectory through a 2-d space described by two range-limited image characteristic controls is computed from Equations 1 and 2:

Consider two controls (A & B) with ranges: −1 to 1. Let i be the index to describe the current frame, and Steps to describe the total number of frames to be computed in the video loop.

$$A(i) = \sin\left(\frac{2 \cdot i \cdot \pi \cdot m}{\text{Steps}}\right) \quad \text{(Equation 1)}$$

$$B(i) = \sin\left(\frac{2 \cdot i \cdot \pi \cdot n}{\text{Steps}}\right) \quad \text{(Equation 2)}$$

Where:
i: The current position of the single 1-d control
Steps: The total number of steps (video frames) computed for the single 1-d control.
m: used to determine how finely to sample the 2d space for the A control
n: used to determine how finely to sample the 2d space for the B control FIG. 8 depicts a traversal with m=1, n=4 in plot 840. FIG. 11 depicts an m=1, n=8 in plot 848. Additional controls add to the dimensionality of the space to be traversed. Additional dimensions would use:

$$X_d(i) = \sin\left(\frac{2 \cdot i \cdot \pi \cdot n^d}{\text{Steps}}\right) \quad \text{(Equation 3)}$$

Where:
X: The image control
d: number of imaging controls-1
n: used to determine how finely to sample the 2d space for the $X_d$ control For every i value, the value of each image control is computed. These values are in turn used to create a transform 760 that is applied to each frame in the video stream 770 (see FIG. 7).

Referring to FIG. 7, the video stream 770 is generated using the list of transforms 760 created in the trajectory calculation 750. Once the video stream 770 is created, it is played to the user via video player 780. A stop/start button 800 is used to start the video stream 770. A loop position controller 790 is used to indicate the current position in the video stream 770. When the user sees the optimal rendering, she presses stop 800. Additionally she can optionally "drag" a pointer in the loop position indicator 785 of the loop position controller 790 to manually find the optimal rendering. This works as a "fine" control. Once the optimal rendering is identified and the user accepts the changes 810, the transform 820 used to create the stopped frame is applied to the entire original image 720 to produce the optimally rendered image 830. In some cases, it may be desirable to group together sets of image characteristics that have a large degree of interaction.

Figure 1:
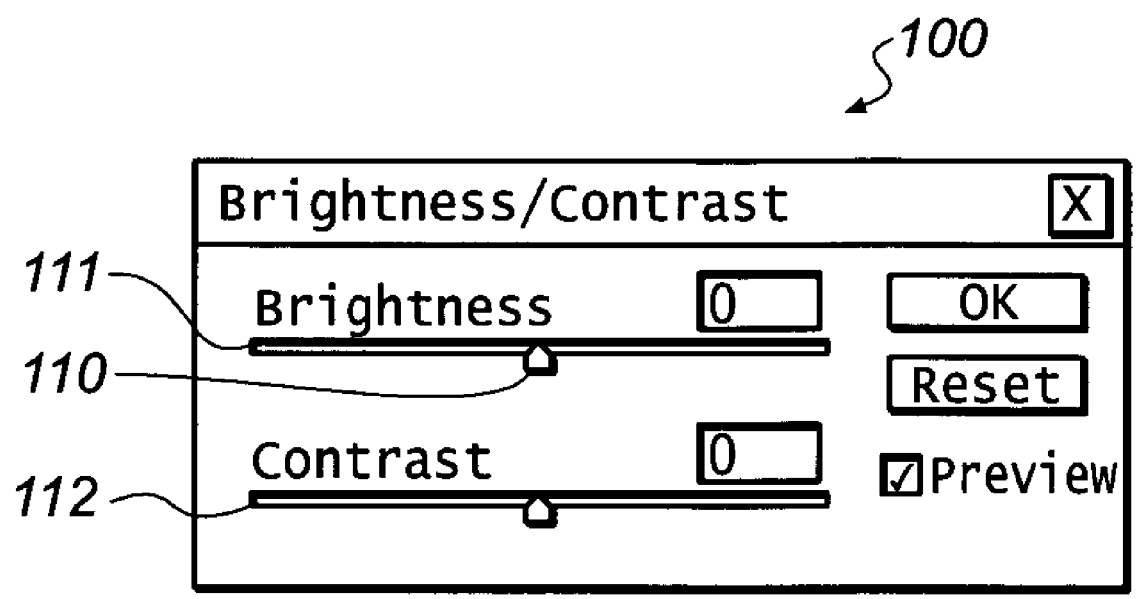
FIG. 1 is a prior art example of a slider user interface.
Figure 2:
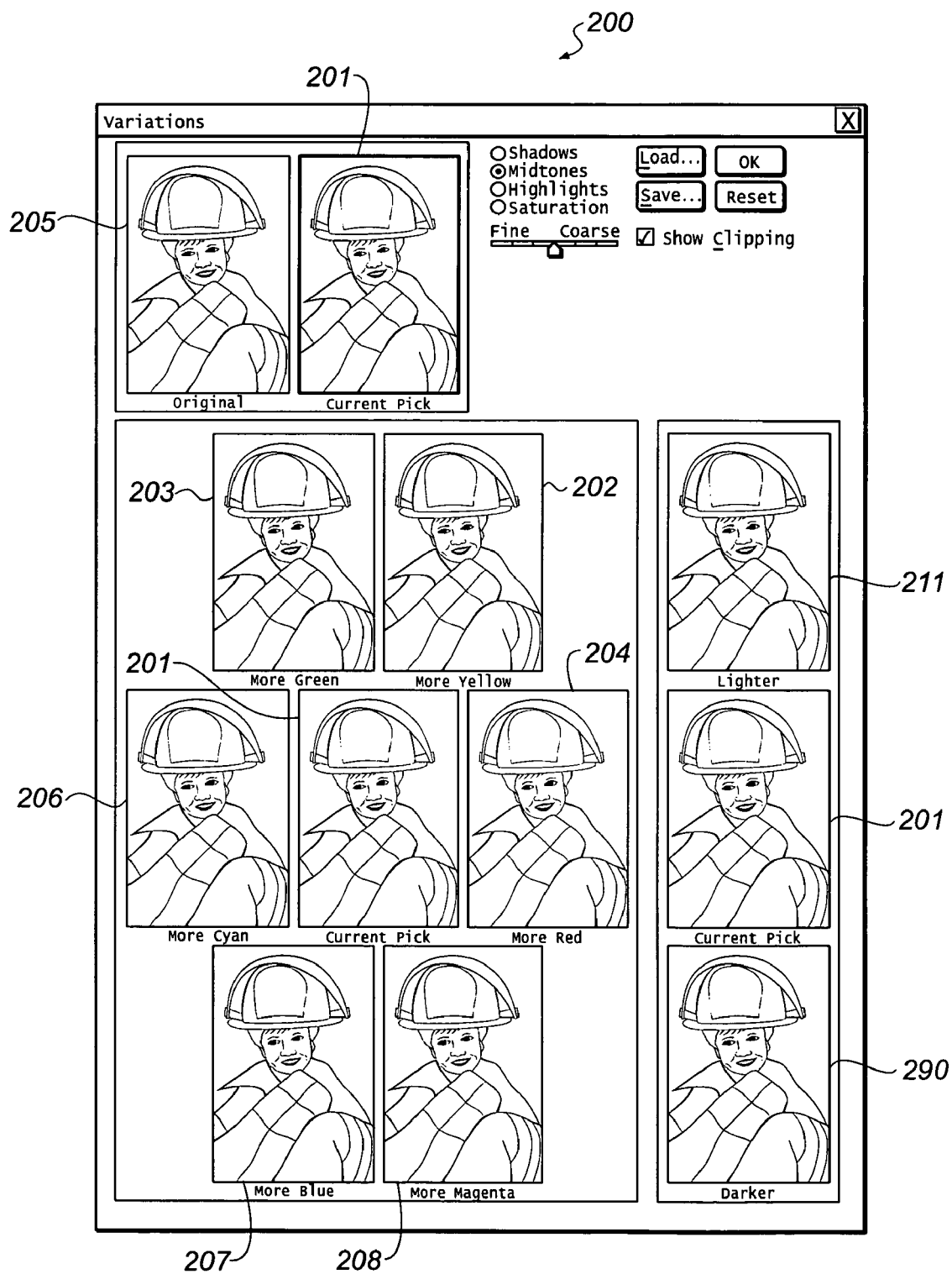
FIG. 2 is a prior art example of a ring around user interface with multiple 1-d controls.
Figure 3:
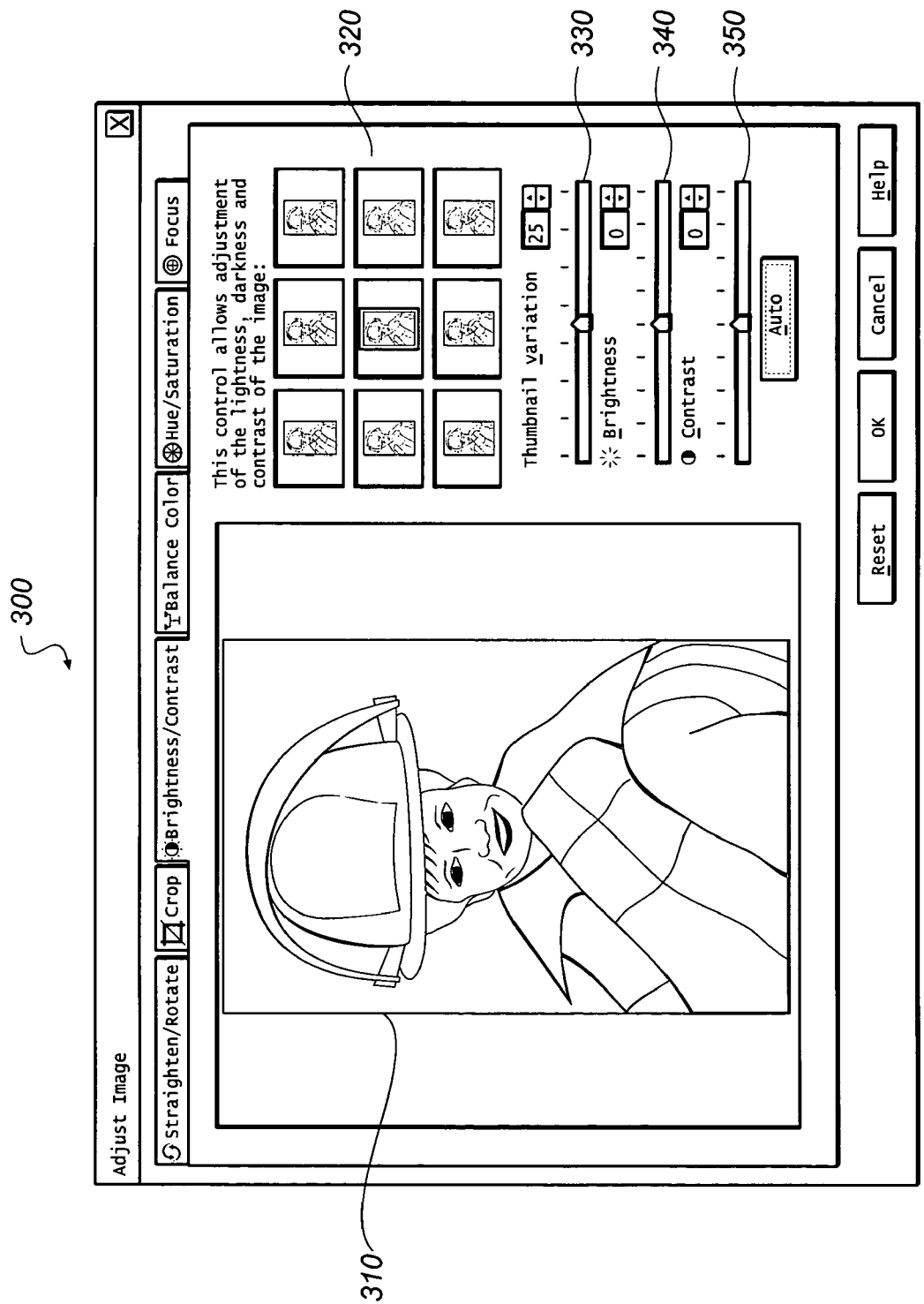
FIG. 3 is a prior art example of a ring around user interface with two interacting 1-d controls 340, 350, and a variation slider 330.
Figure 4:
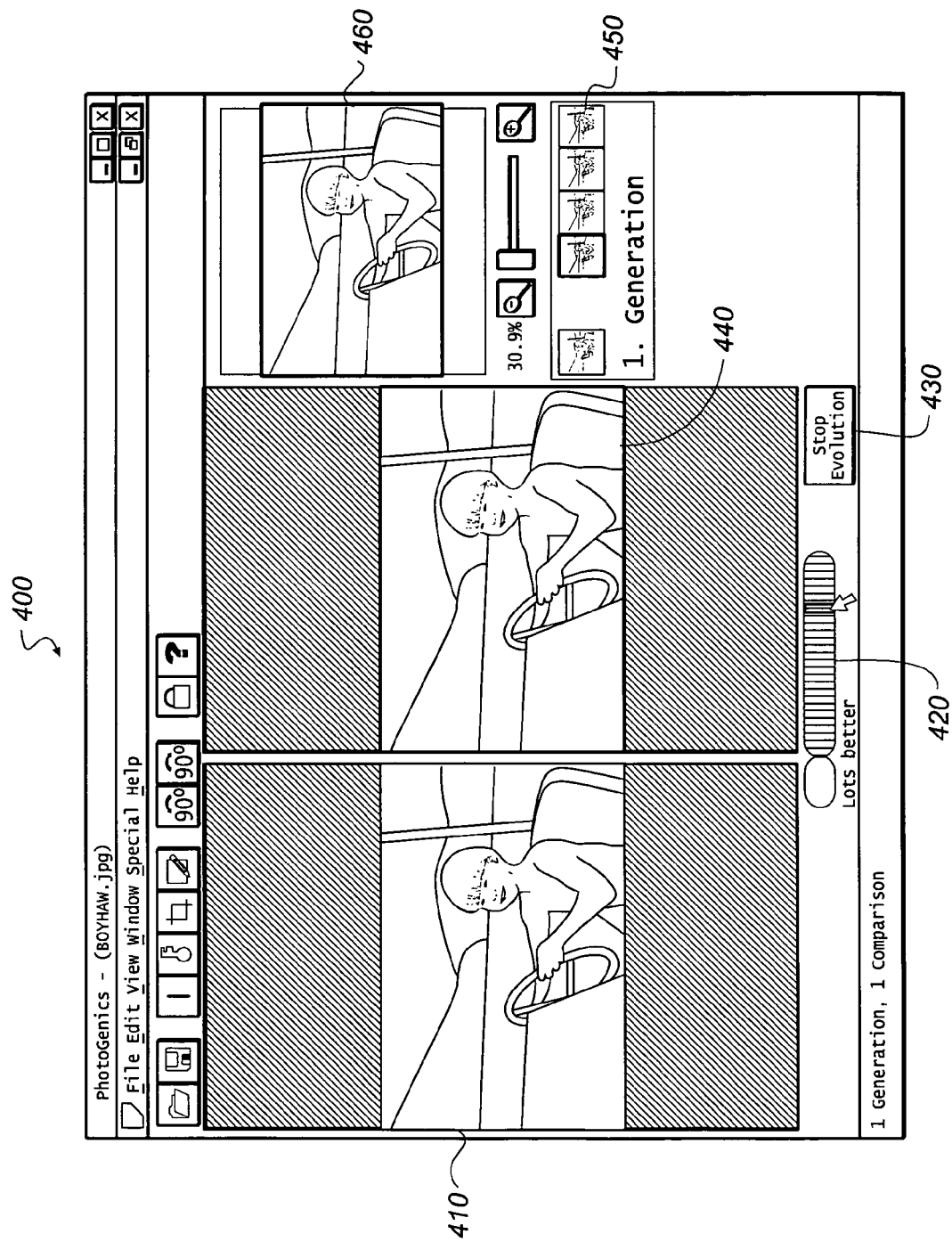
FIG. 4 is a screen shot of the PhotoGenetics' user interface.
Figure 5:
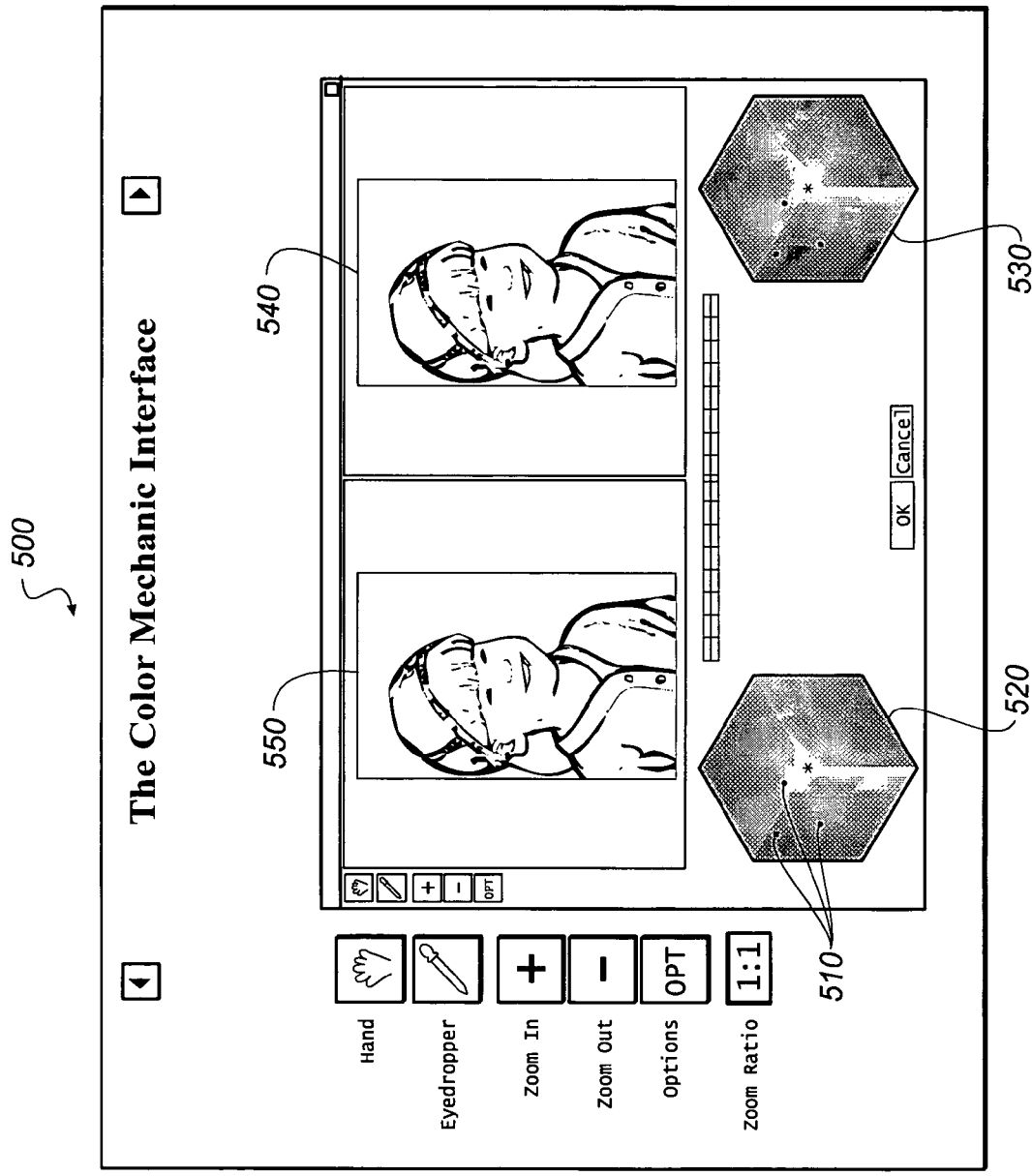
FIG. 5 is a screen shot of the Color Mechanic user interface.
Figure 6:
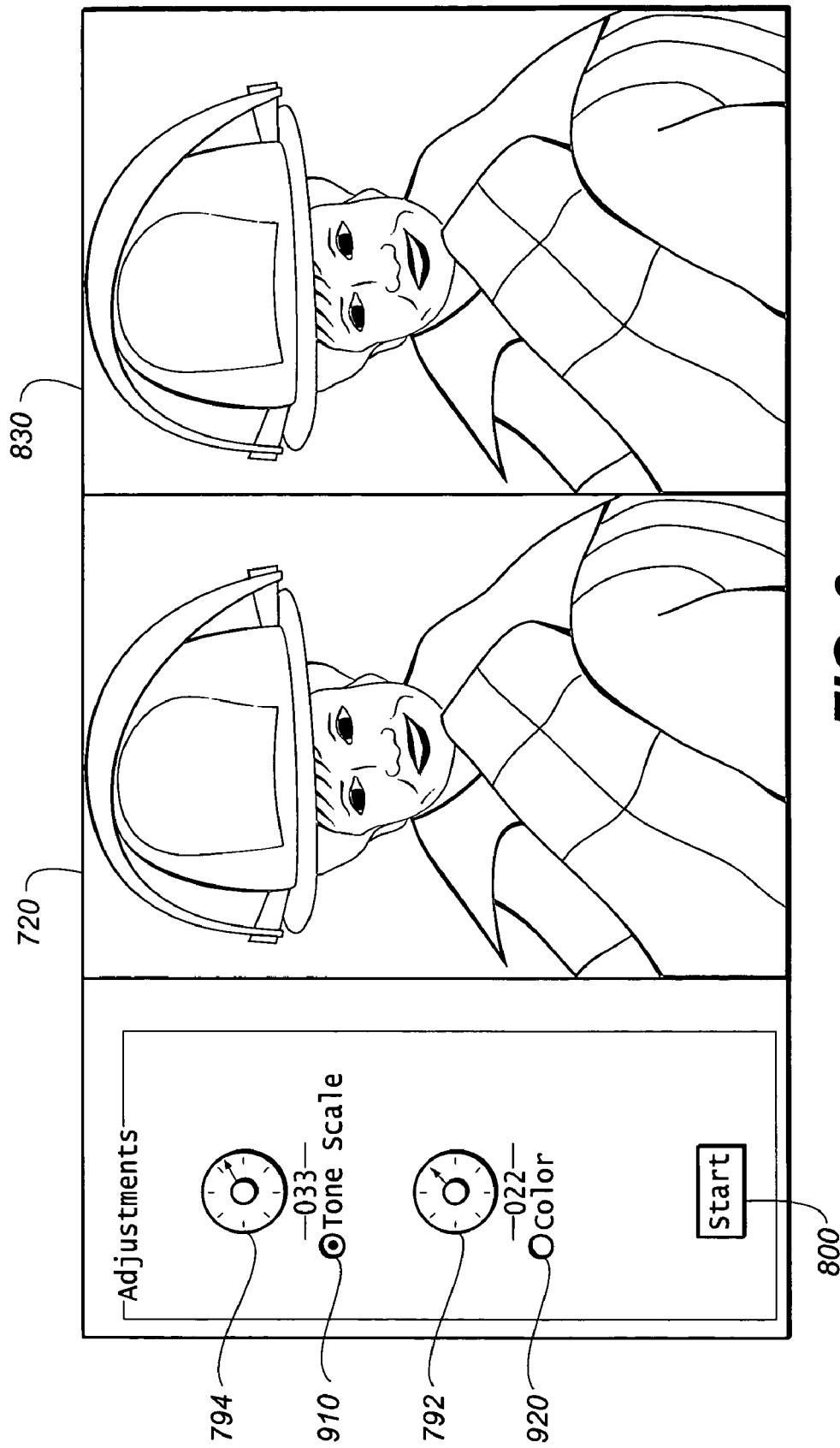
FIG. 6 is a screen shot of the user interface practicing the current invention.

FIG. 6 depicts a user interface according to the present invention. This exemplary embodiment groups together tone scale controls: brightness, saturation and gamma correction onto a tone scale loop position controller 794. Color related adjustments including saturation and color temperature are delegated to a color loop position indicator 792. Radio buttons (910 and 920) are used to toggle between the two video loops. Settings determined in one loop are used in the other loop. Each loop position control 794, 792 represents multiple image characteristic controls that also are used to manage multiple sets of image characteristic controls.

The invention has been described with reference to one or more embodiments. However, variations and modifications to any disclosed embodiment can be effected by a person of ordinary skill in the art without departing from the scope of the invention.

PARTS LIST 100 image slider control user interface
110 "thumb" on a brightness slider control
111 brightness control slider
112 contrast control slider
200 1-d ring around control user interface
201 current pick image
202 image shifted yellow
203 image shifted green
204 image shifted red 205 original image
206 image shifted cyan
207 image shifted blue
208 image shifted magenta
209 image shifted darker
211 image shifted lighter
300 2-d ring around control user interface
310 reference image
320 grid
330 thumbnail variation slider
340 brightness control slider
350 contrast control slider
400 user interface
410 current pick image
420 quality indicator slider
430 stop evaluation button
440 modified image
450 generation selection buttons
460 original image
500 color mechanic user interface
510 color control points
520 input color hexagon
530 preview color hexagon
540 preview image
550 input image check
700 block diagram
710 input image characteristic controls
710a contrast control
710b brightness control
710c gamma correction control
720 original image
730 space reduction analysis
740 range-limited image characteristic controls
740a range-limited image characteristic control
740b range-limited image characteristic control
740c range-limited image characteristic control
750 trajectory calculation
760 image transforms for each video frame blocks
770 video stream
780 video player
785 loop position indicator
790 loop position controller
792 color loop position indicator
794 tone scale loop position controller
800 start/stop button
810 accept pressed decision
820 image transform associated with the selected rendering
830 image processed with selected rendering
840 brightness vs. contrast plot
848 plot
850 set of corresponding positions for loop position control
860 loop position indicator at initial position
862 loop position indicator at ⅛ position
863 loop position indicator at ¼ position
864 loop position indicator at ⅜ position
865 loop position indicator at ½ position
866 loop position indicator at ⅝ position
867 loop position indicator at ¾ position
868 loop position indicator at ⅞ position
869 loop position indicator back at initial position
910 tone scale radio button
920 color radio button

What is claimed is:

1. A method for selectively optimizing a plurality of image characteristics for captured images, comprising the steps of:
   a) modifying two or more one-dimensional image characteristic controls according to instructions stored in a computer readable medium by using a single loop position controller having one-dimensional control, wherein the single loop position controller traverses useful ranges of each of the two or more one-dimensional image characteristic controls;
   b) providing a perceptually continuous video loop from a video stream of captured images to a user by cycling through several combinations of the two or more one-dimensional image characteristic controls; and
   c) a means of selecting a desired image rendered according to the two or more one-dimensional image characteristic controls while the perceptually continuous video loop plays without any user intervention until the user's desired rendered image appears; and
   d) ensuring the video loop continuously follows a path through the useful ranges of each of the two or more one-dimensional image characteristic controls from a first image nominal state through a transition state of the several combinations of images and back to the nominal state; and
   e) defining the entire length of the video stream of captured images within the path in the transition state according to different useful range values of each of the two or more one-dimensional image characteristic controls.

2. The method claimed in claim 1, further comprising the step of mapping a set of range-limited image controls onto the single loop position controller.

3. The method claimed in claim 1, wherein the means of selecting a desired image includes stopping the video loop at the desired image.

4. The method claimed in claim 1, wherein the means of selecting a desired image includes moving the single loop position controller to the desired image.

5. A method of generating a perceptually continuous video loop of images over limited ranges, comprising the steps of:
   a) providing a plurality of image characteristic controls for an original image according to instructions stored in a computer readable;
   b) limiting ranges for the plurality of image characteristic controls according to analysis of space reduction requirements to form a range-limited n-dimensional space; and
   c) computing a trajectory path through the range-limited n-dimensional space to create a set of transitioning images as a video stream to be provided in the perceptually continuous video loop
   d) defining a portion of the trajectory path through the range-limited n-dimensional space having at least one of the plurality of image characteristic controls maintained substantially constant while the trajectory path continues traversing the limiting ranges of remaining image characteristic controls.

6. The method claimed in claim 5, wherein the perceptually continuous video loop plays without user intervention until a user's desired rendered image appears.

7. The method claimed in claim 6, wherein the video loop is controlled with a loop position indicator to find a desired image rendered according to the plurality of image characteristic controls.

8. The method claimed in claim 6, wherein the video loop is started and/or stopped with a button.

9. The method claimed in claim 1, further comprising the step of:
   f) providing an original image adjacent to the video loop of captured images.

10. An image editor, comprising:
a) a single one-dimensional image characteristic control that traverses useful ranges of each of a plurality of one-dimensional image characteristic controls; and
b) a perceptually continuous video loop that cycles through several combinations of the single one-dimensional image characteristic control for controlling a plurality of image characteristics reflected in a video stream, wherein the perceptually continuous video loop plays without any user intervention until the user's desired rendered image appears.

11. The image editor claimed in claim 10 further comprising a mapped set of range-limited image controls.

12. The image editor claimed in claim 11, wherein the mapped set of range-limited image controls is determined by limiting ranges for the plurality of one-dimensional image characteristic controls according to analysis of space reduction requirements to form a range-limited n-dimensional space.

* * * * *

UNITED STATES PATENT AND TRADEMARK OFFICE
CERTIFICATE OF CORRECTION

PATENT NO. : 7,623,722 B2  Page 1 of 1
APPLICATION NO. : 10/693040
DATED : November 24, 2009
INVENTOR(S) : Wayne E. Prentice et al.

It is certified that error appears in the above-identified patent and that said Letters Patent is hereby corrected as shown below:

| Issued Patent Column | Line | Description of Error |
|---|---|---|
| 8 | 40 | In Claim 5, after "readable" insert -- medium --, therefore. |
| 8 | 48 | In Claim 5, after "loop" insert -- ; --. |
| 10 | 1 | In Claim 11, after "claim 10" insert -- ; --. |

Signed and Sealed this

Second Day of February, 2010

David J. Kappos
*Director of the United States Patent and Trademark Office*